March 31, 1925. 1,531,361

F. VARILLON ET AL

THREAD FLY

Filed Nov. 4, 1924

Witnesses
Jean Maureau
Henri Rustant

Inventors
François Varillon
Louis Batayron
Eugène Wilmouth

Patented Mar. 31, 1925.

1,531,361

UNITED STATES PATENT OFFICE.

FRANÇOIS VARILLON, LOUIS BATAYRON, AND EUGÈNE WILMOUTH, OF LYON, FRANCE.

THREAD FLY.

Application filed November 4, 1924. Serial No. 747,869.

*To all whom it may concern:*

Be it known that we, FRANÇOIS VARILLON, LOUIS BATAYRON, and EUGÈNE WILMOUTH, residing at Lyon, France, all citizens of the French Republic, have invented certain new and useful Improvements in Thread Flies, of which the following is a specification.

The present invention has for its object an improved thread fly characterized by the method of mounting the warp-bobbin on the socket rotatable round the usual hollow shaft supporting the fly.

The rotatable socket is in two parts one of which carries the warp-bobbin mounted on a split socket at one end of which is arranged the winding off member mounted on ball or other bearings and provided with an adjustable braking device.

The other part consists of a socket rotating as usual round the hollow shaft and engaging with slight friction in the split socket of the other part the walls of which it forces apart so that they press against the inner wall of the warp-bobbin.

This method of mounting has the advantage of facilitating the exchange of the warp-bobbin by a simple disconnection of the members without necessitating the use of screws for re-assembling the parts dismounted for bobbin changing operation.

Different forms of construction of the movable part carrying the winding off member can be arranged; in particular it can be provided with a single hole through which passes the textile or other core which the spun thread is to cover or with a hole of larger size affording passage to an extension of the hollow shaft which thus protects the said core from any contact with the rotating part of the fly. This latter arrangement prevents the textile core from becoming caught by the rotating part and drawn along thereby due to an irregularity in its thickness.

The annexed drawing illustrates two forms of construction of the invention.

Figure 1:
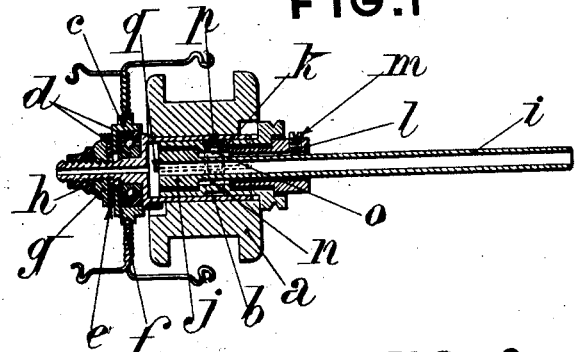
Fig. 1 is a longitudinal section of a fly in which the hollow shaft does not extend through the entire rotary part.
Figure 2:
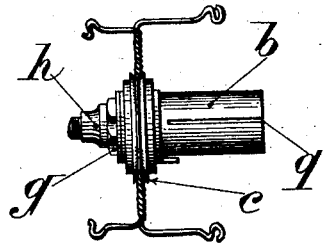
Figs. 2 and 3 illustrate the constituent parts of the fly.

The warp-bobbin $a$ is mounted on a split socket $b$ (Fig. 2) on the one side of which the winding off member $c$ is suitably mounted for instance by a ball bearing $d$ which reduces the friction. Braking of the member $c$ can be effected either by means of a spring the tension of which is adjustable, or by means of a leather washer $e$ the pressure of which against the bearing case $f$ can be regulated by means of the nut $g$ and locking nut $h$.

Figure 3:
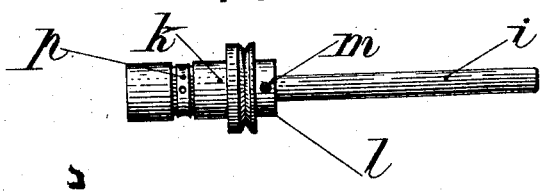

The other part of the fly (Fig. 3) comprises the hollow shaft $i$ which is terminated by a cylindrical bearing head $j$ against which abuts the sleeve $k$ supported on the other side by the adjustable bearing or collar $l$ which is slidable on the shaft $i$ and is fixed by means of the screw $m$.

The sleeve $k$ which serves as a bearing member is provided with an oil-chamber $n$ which can be filled through the orifice $o$ provided with a spring cap $p$.

The warp-bobbin $a$ being slid on the split socket $b$ is secured thereto by the introduction into the interior of the latter, of the sleeve $k$ carried by the hollow shaft $i$.

The gentle force used opens the halves $q$ of the split socket $b$ the walls of which are thus firmly pressed against those of the warp-bobbin $a$.

In order to change the warp bobbin the two sockets $b$ and $k$ are disconnected and again fitted together when a new warp-bobbin has been slid on the socket $b$.

This operation is very easy to perform and allows of effecting an appreciable saving of time at changes of the warp-bobbins.

Figure 4:
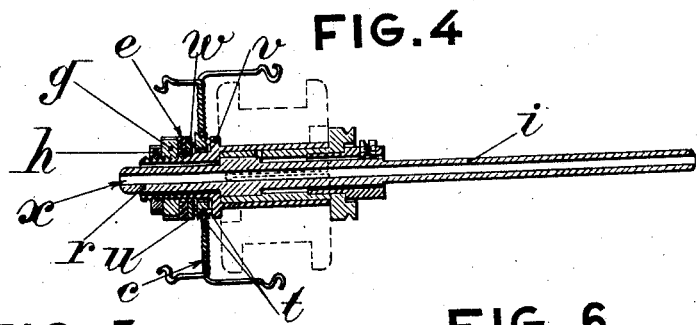
Fig. 4 is a longitudinal section of a modification in which the hollow shaft extends completely through the rotating part of the fly.
Figure 5:
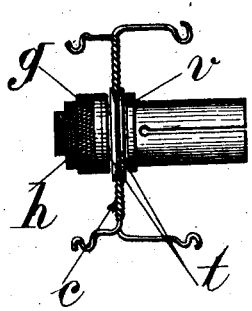
Figs. 5 and 6 show the constituent parts thereof.
Figure 6:
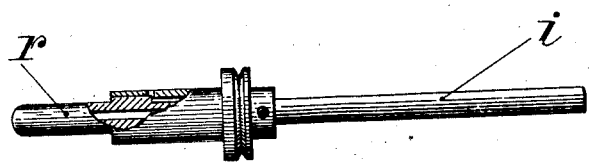

In the modification shown in Figs. 4 to 6, the hollow shaft $i$ comprises an extension $r$ which passes through the whole rotating part of the fly. The increase of diameter of the rotating part $s$ prevents the mounting of the winding off member $c$ on a ball bearing of the usual type, balls $t$ being inserted between the winder-off holding disc $u$ and the cheek $v$ or the washer $w$. The whole is kept connected by tightening the nut *g* and lock-nut *h*, between which is a packing washer *e*.

In this manner the core for the thread which passes through the hollow shaft *i* is surrounded by said shaft and protected until it issues from the tube *x*.

What we claim as our invention and desire to secure by Letters Patent of the United States is:—

1. A thread fly comprising a split socket a rotary member mounted at one end of said socket, thread guides carried by said rotary member, a hollow shaft a sleeve rotatably mounted on said shaft and engaged by friction in said split socket and a warp-bobbin mounted on said split socket.

2. A thread fly comprising a split socket a member having a central orifice mounted at one end of said socket, a ball bearing carried by said member a rotary member mounted on said ball bearing thread guides carried by said rotary member a hollow shaft a head at one end of said shaft a bearing member keyed on said shaft, a sleeve rotatable about said head shaft and bearing member said sleeve engaging in said split socket by friction a warp bobbin mounted on said split socket and means for lubricating said rotatable sleeve.

In witness whereof we have signed this specification in the presence of two witnesses.

FRANÇOIS VARILLON.
LOUIS BATAYRON.
EUGÈNE WILMOUTH.